United States Patent
Schaffer

[19]

[11] Patent Number: 5,926,613
[45] Date of Patent: Jul. 20, 1999

[54] METHOD AND APPARATUS FOR ENCODING PAN-EDIT VECTORS FOR FILM TO TAPE TRANSFER

[75] Inventor: Mark Lindsay Schaffer, San Diego, Calif.

[73] Assignees: Sony Corporation, Tokyo, Japan; Sony Electronics, Park Ridge, N.J.

[21] Appl. No.: 08/722,628

[22] Filed: Sep. 27, 1996

[51] Int. Cl.[6] ............................... H04N 5/91; H04N 7/01
[52] U.S. Cl. ..................... 386/131; 348/445; 348/473; 348/556
[58] Field of Search ................. 386/131, 1, 125, 386/126, 33, 35; 348/445, 473, 478, 556

[56] References Cited

U.S. PATENT DOCUMENTS 5,493,339  2/1996  Birch et al. ............................. 348/461
5,742,727  4/1998  Kanota et al. ............................ 386/26

*Primary Examiner*—Wendy Garber
*Assistant Examiner*—Christopher Onuaku
*Attorney, Agent, or Firm*—Blakely, Sokoloff, Taylor & Zafman LLP

[57] ABSTRACT

A digital bit stream including video data is transmitted via a digital video transmission system for presentation on a television receiver. The video data is suitable for viewing on a television receiver having a first aspect ratio. Transmitted within a predefined field of the digital bit stream are pan-edit vectors which, when applied to the video data, produce a resulting signal suitable for presentation on a television receiver having a second aspect ratio. The digital video signal may comprise an MPEG video stream. The digital video transmission system may include a transmission link, such as a satellite transmission system, for transmission of the digital bit stream.

42 Claims, 7 Drawing Sheets

METHOD AND APPARATUS FOR ENCODING PAN-EDIT VECTORS FOR FILM TO TAPE TRANSFER

FIELD OF THE INVENTION

The present invention relates generally to digital video transmission systems and, more particularly, to a method and apparatus for encoding user defined pan-edit information within digital video bit streams transmitted within such systems.

BACKGROUND

Current cable and digital satellite television systems are capable of broadcasting two formats of television programming. One format allows the use of high definition televisions having aspect ratios of 16×9. A second format provides television programming for televisions having a standard 4×3 aspect ratio. However, the use of two video bit streams to transmit the same programming in these alternative formats is both expensive and wasteful of the available bandwidth. Although current satellite television decoders are capable of extracting pan-edit information from a digital bit stream broadcast by a satellite television service provider, as yet no satisfactory method of extracting and then encoding such information within the digital video bit stream has been achieved.

SUMMARY OF THE INVENTION

Accordingly, it is an object of the present invention to provide a method of extracting pan-edit information during film post-production and then encoding the information within a digital video bit stream for broadcast by a television service provider.

According to one embodiment, a digital bit stream including video data is transmitted for presentation on a television receiver. The video data is suitable for viewing on a television receiver having a first aspect ratio. Transmitted within a predefined field of the digital bit strem are pan-edit vectors which, when applied to the video data, produce a resulting signal suitable for presentation on a television receiver having a second aspect ratio. The digital bit stream may comprise an MPEG video stream.

In another embodiment, the present invention provides a digital video transmission system including a source of video data and an encoder. The video data includes first data for presentation on a video viewing system such as a television having a first viewing aspect ratio. The video data also includes second data for use with the first data to generate a video signal suitable for presentation on a video viewing system such as a televising having a second viewing aspect ratio. The encoder is configured to receive the video signal from the source and to generate a composite digital video signal therefrom. The composite digital video signal may be an MPEG video signal. Further, the second data may comprise pan-edit information which is encoded into a predefined field of the MPEG video stream. The digital video transmission system may also include a transmission link, such as a satellite transmission system, for transmission of the resulting digital video signal.

In yet another embodiment, pan-edit vectors are encoded into a video signal by first editing a first formatted version of video signal to derive a second formatted version of the video signal with associated pan-edit vectors. The first formatted version of the video signal is then recorded on a media and the pan-edit vectors corresponding to the second formatted version are recorded on the same media. Preferably, the two recording steps occur at the same time and the pan-edit vectors are recorded at locations within the first formatted version of the video signal corresponding to a video blanking interval.

BRIEF DESCRIPTION OF THE DRAWINGS

The present invention is illustrated by way of example and not limitation in the figures of the accompanying drawings in which.

DETAILED DESCRIPTION

Typically, during the film to tape transfer process of film post production, pan and scan edits are made for the purpose of "fitting" the film material into a standard television's aspect ratio (4×3). These edits involve selecting the "director approved" or the most important 4×3 region of the wider format film source to be displayed. Currently, during the editing process the pan and scan edit vectors are stored on a computer readable media in a format suitable for use only in additional transfer sessions. The present invention provides a method of encoding pan (and scan) edit vectors in a standard format and encoding these edit vectors within a standard television broadcast signal, suitable for transmission by digital satellite and/or cable television service providers.

It should be noted that the digital satellite system (DSS) signal currently broadcast by satellite television service providers such as Direct TV and USSB accommodates the transmission of pan-edit vectors within the MPEG video stream. Additionally, DSS decoders currently manufactured are pan-edit ready and have the ability to interpret the panedit vectors and appropriately decode the intended 4×3 edit. Although the remaining discussion focuses on the use of pan-edit information, those skilled in the art will recognize that similar procedures may be used to encode scan-edit information.

During the film post production process, master copies of the original film are transferred to video tape and pan and scan editing is typically performed to derive video versions suitable for showing on television sets. The television sets may have a wide aspect ratio (16×9) or, more commonly, a standard aspect ratio (4×3). Typically, a color corrector is used to perform the editing process. The pan-edit vectors produced as a result of the editing session are generally stored in a unique format (particular to the type of color corrections used for the editing process) on a computer readable media such as a disk.

Figure 1:
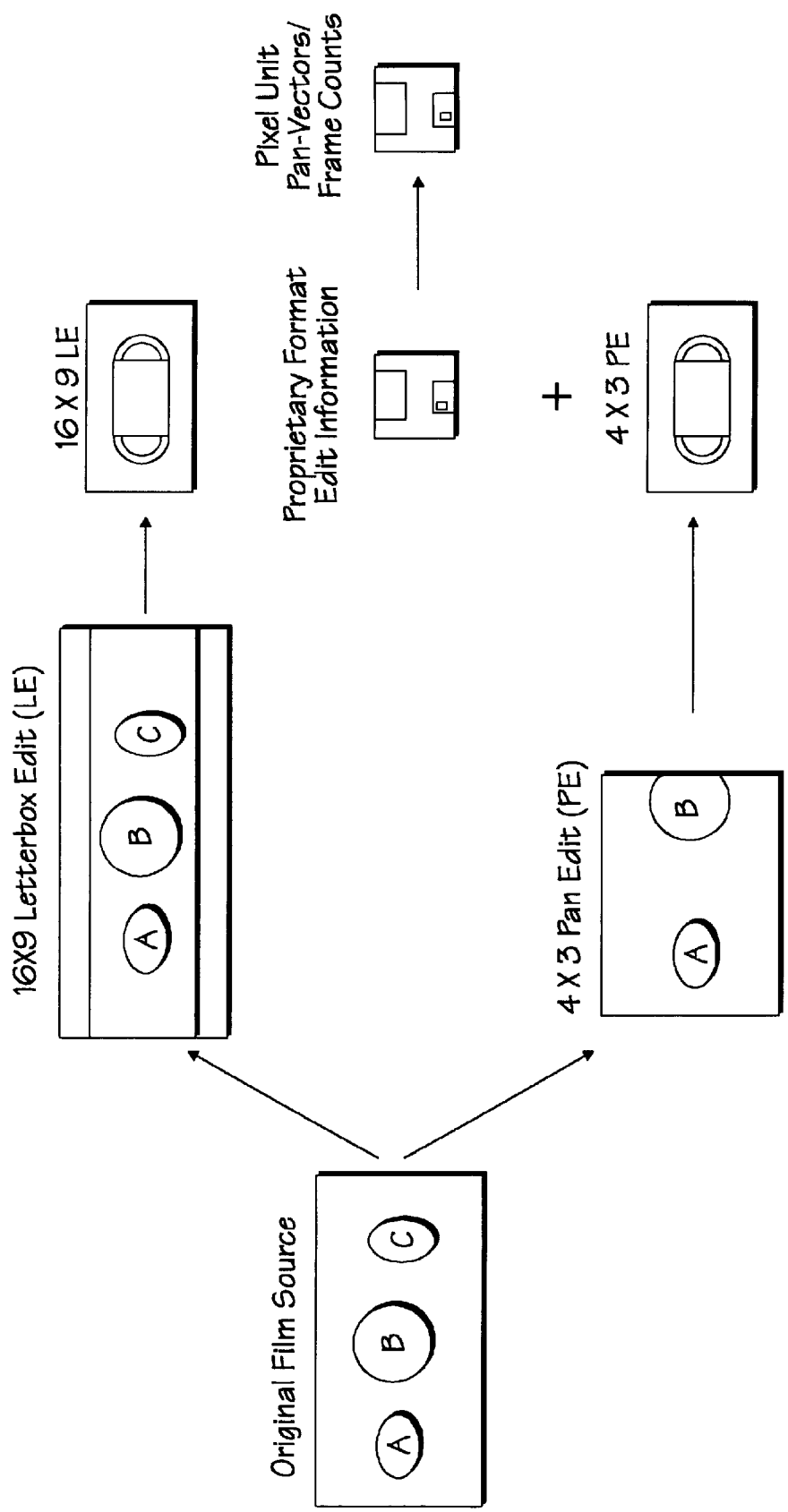
FIG. 1 illustrates a film to tape transfer of matted 16×9 and pan-edited 4×3 material.

According to one embodiment, to allow for the broadcast of 16×9 source material with associated 4×3 pan-edit vectors, two film to tape transfers are required: one for the 16×9 edit and one for the 4×3 edit. These limitations are a result of currently accepted industry practice. However, the present invention does not require that two separate edits of an original film be made. During these edit operations, a color corrector operator (colorist) may choose to do a pan-edit to produce a 16×9 version of a original film or the colorist may choose to "matt" the original film source into a letter box format. The letter boxing technique is used commonly when displaying source material with a wider aspect ratio than the display device. FIG. 1 illustrates this film to tape transfer process.

As shown in FIG. 1, a original film source is edited by a colorist to generate a 16×9 letter box version (16×9 LE) as well as a 4×3 pan-edit version (4×3 PE). The letter boxing shown in FIG. 1 is typically performed using vertical decimation on the original film source. Each edited version of the film is stored on video tape or other recordable media. The editing process used to generate the 4×3PE version also produces pan-edit information (vectors) which is stored on computer disk. The pan-edit vectors may correspond to the DaVinci format, common in the film industry. According to the present invention, the DaVinci or other proprietary formatted pan-edit information is converted to pixel unit format for further use. This conversion process is discussed further below. It should be noted that pan-edit vectors may vary from color corrector to color corrector. Accordingly, a calibration procedure should be performed prior to or during the editing/conversion process. During calibration, a colorist would pan completely to the left and completely to right, recording the associated proprietary format pan units for each extreme. This will provide a dynamic pan range for a particular color corrector which can then be used when converting to pixel units.

The process of converting proprietary format pan-edit vectors to pixel unit format is discussed with reference to DaVinci-format vectors. It should be apparent, however, that similar processes may be used for other proprietary format pan-edit information derived from various color correctors. Those skilled in the art will appreciate that DaVinci-type color correctors provide pan-edit vectors with reference to two end-points within a video sequence. That is, two frames of video (with their corresponding frame count values) are selected during the editing process and pan-edit information is generated for each of these frames. The pan-edit information for the remaining frames in the sequence which fall between the two end-points is interpolated from the vectors for the two end-points according to a selected "dissolve". A dissolve is a function which relates the pan-edit vectors for the two end-points in a known fashion. For example, typical DaVinci color correctors allow the use of linear plus ramp-up, linear plus ramp-down, ramp-up plus ramp-down, and other dissolves. Thus, DaVinci pan-edit information is not recorded on a frame-by-frame basis. Rather, pan-edit vectors are recorded for end-point frames and an interpolation process is required to derive pan-edit information for frames between the end-points.

In contrast, the present invention provides frame-by-frame pan-edit information in pixel units, rather than in the proprietary DaVinci (or other) units. To obtain frame-by-frame pan-edit information, the DaVinci pan-edit information must be decoded (i.e., interpolated) from the Davinci color corrector output. In other words, during the editing process, a colorist or other operator will generate pan-edit information for each frame of video information by interpolating between end-points of a video sequence. The interpolation will be performed according to the type of dissolve used during the color correcting process.

Next, the frame-by-frame pan-edit information will be converted from DaVinci units to pixel units. Recognize that a standard 4×3 aspect ratio television will have 720 pixels of horizontal resolution with a dynamic pixel pan range of ±90 pixels. A typical DaVinci color corrector will provide pan edit vectors in the range [−8000, 8000], although the calibration process described above will provide a precise dynamic range for each individual color corrector. Using this information, the pixel unit conversion for each frame of video is peformed according to the following equation:

$$\frac{\text{DaVinci Pan-Eedit Vector for Frame } m}{8000} \times 90 =$$

Pixel Unit Pan-Edit Vector for Frame $m$

As shown in FIG. 1, these pixel unit pan-edit vectors may be recorded (along with the appropriate frame count values corresponding to the pan-edit values) on a computer readable media such as a disk in a computer readable format such as ASCII. Note that in the above equation, the divisor (8000) may be replaced by an appropriate value derived from the dynamic pan range calibration process described above.

Figure 2:
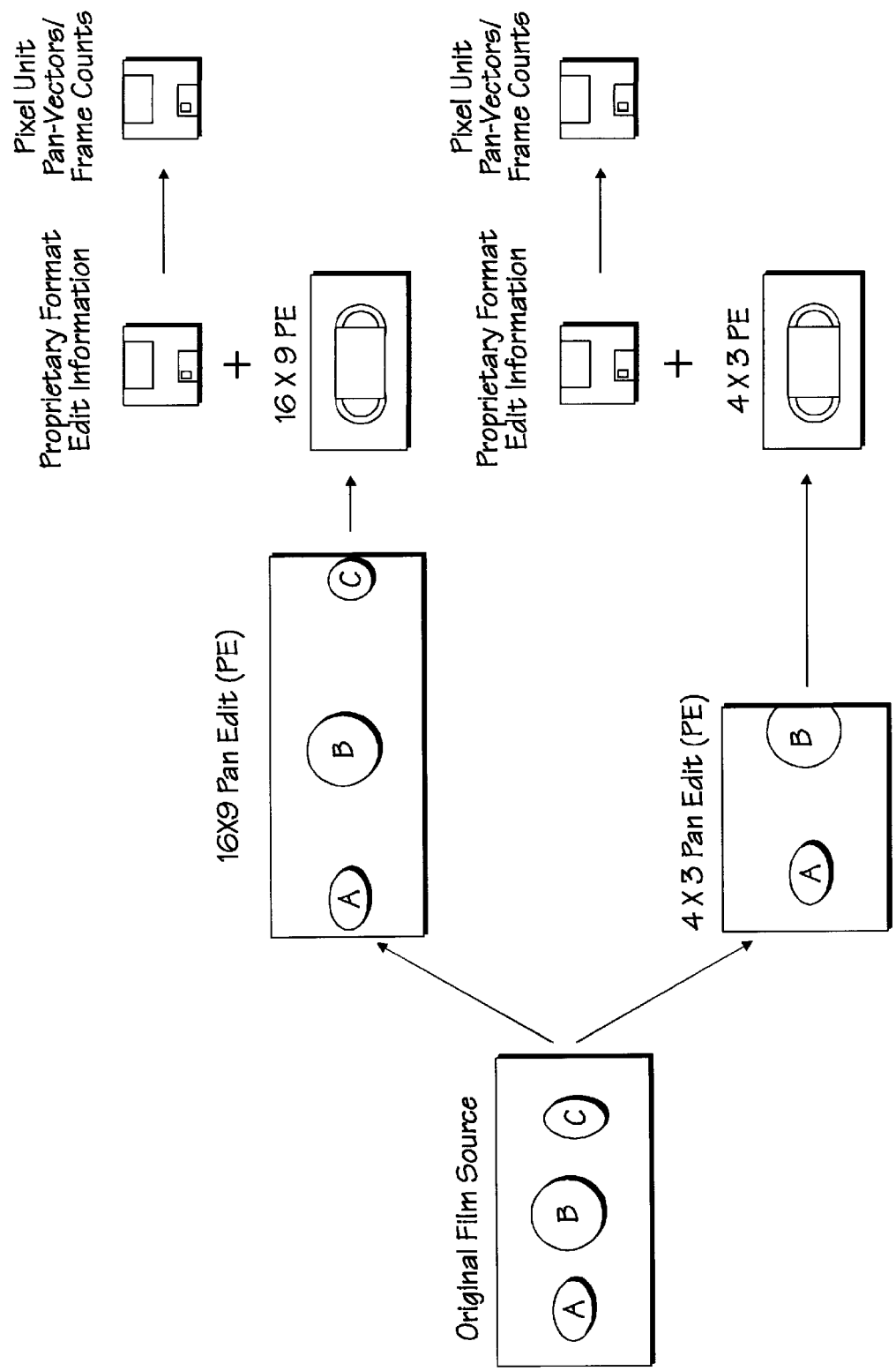
FIG. 2 illustrates a film to tape transfer of pan-edited 16×9 and 4×3 material.

FIG. 2 illustrates a second example of a film to tape transfer process. For the example shown in FIG. 2, both the 16×9 and 4×3 transfers involve pan-editing. Thus, an extra file containing the 16×9 editing parameters is produced and converted to an ASCII or other format and correlated with the 4×3 edits.

The two versions of the original film master, one a 16×9 formatted version and the other a 4×3 formatted version, could be broadcast separately (e.g., on different channels) by a television service provider. Home viewers with televisions having a 16×9 aspect ratio would tune in to the broadcast of the 16×9 presentation while those viewers with televisions having a standard 4×3 aspect ratio would tune in to the broadcast of the 4×3 formatted version. This approach may be costly, however, because it requires two parallel transmission systems and wastes available bandwidth given that the same basic video information must be transmitted twice. The present invention provides a means of combining both edit versions of the film master within a single bit stream for transmission by the television service provider. This allows bandwidth to be conserved and costs to be reduced while at the same time providing viewers with a choice of television programming.

Accordingly, after the pixel unit pan-edit vectors for the 4×3 edit version of the film master have been generated, this information is injected into the vertical blanking interval of the 16×9 formatted version of the film. As is familiar to those skilled in the art, several extended data services (EDS) currently define user information for inclusion within the vertical blanking interval of a standard NTSC television signal. Similar formats exist for PAL television signals. Closed captioning data is an example of EDS. The same technique can be used to store the 4×3 pan-edit information within the vertical blanking interval of the 16×9 formatted version of the original film.

Figure 3:
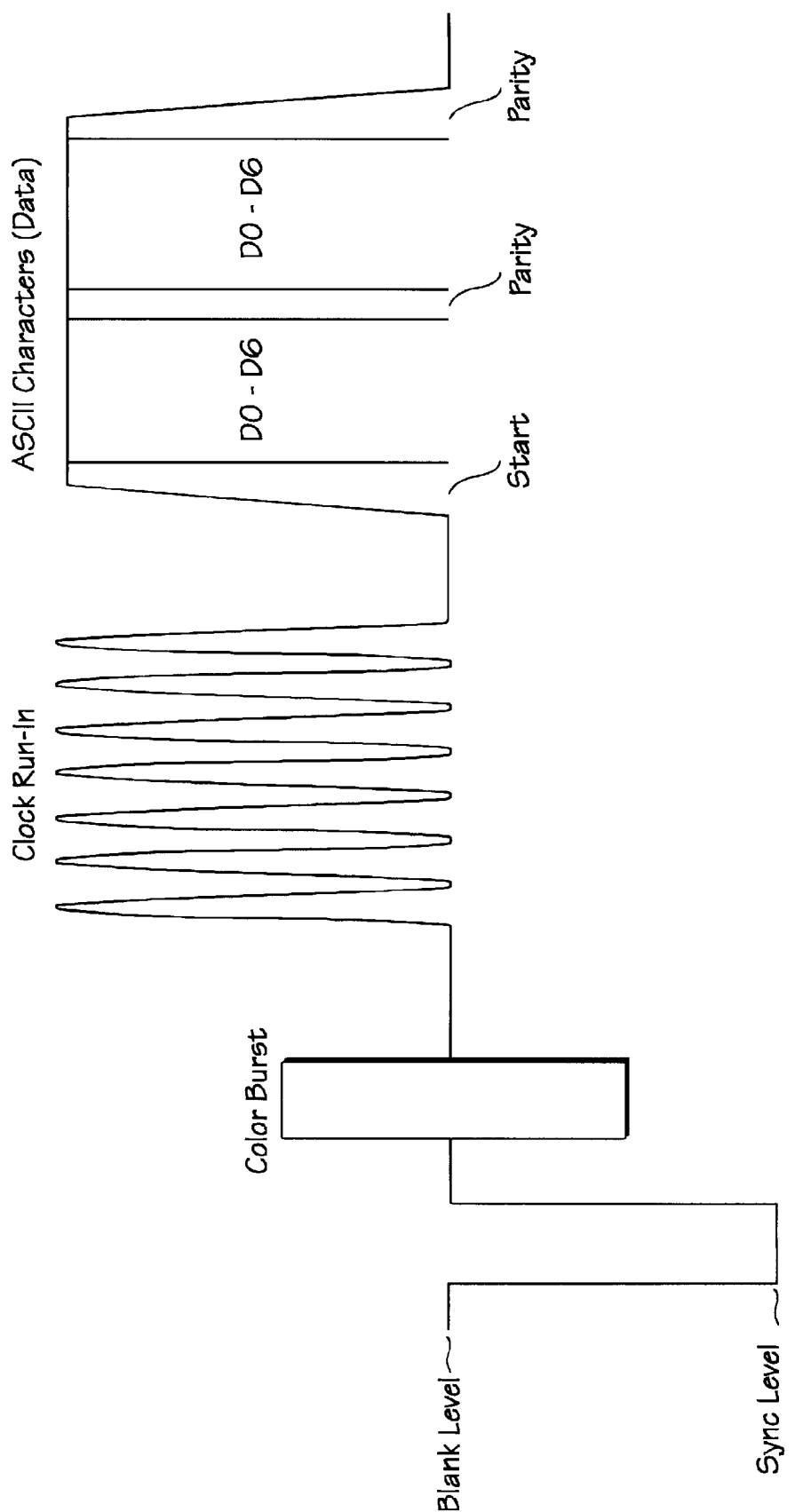
FIG. 3 illustrates an encoded NTSC line including pan-edit vectors.

As shown in FIG. 3, the pixel unit pan-edit information for the 4×3 edit version can be encoded into the vertical blanking interval (VBI) of the 16×9 edit version similarly to the manner in which close captioning information is stored. For a selected line or lines of the VBI, data in the form of ASCII (or other) characters are encoded within a portion of the line following a clock run-in. Parity bits and start bits may be used to define the character fields in the VBI line(s). Any unassigned line(s) of the VBI may be used for this purpose.

Figure 4:
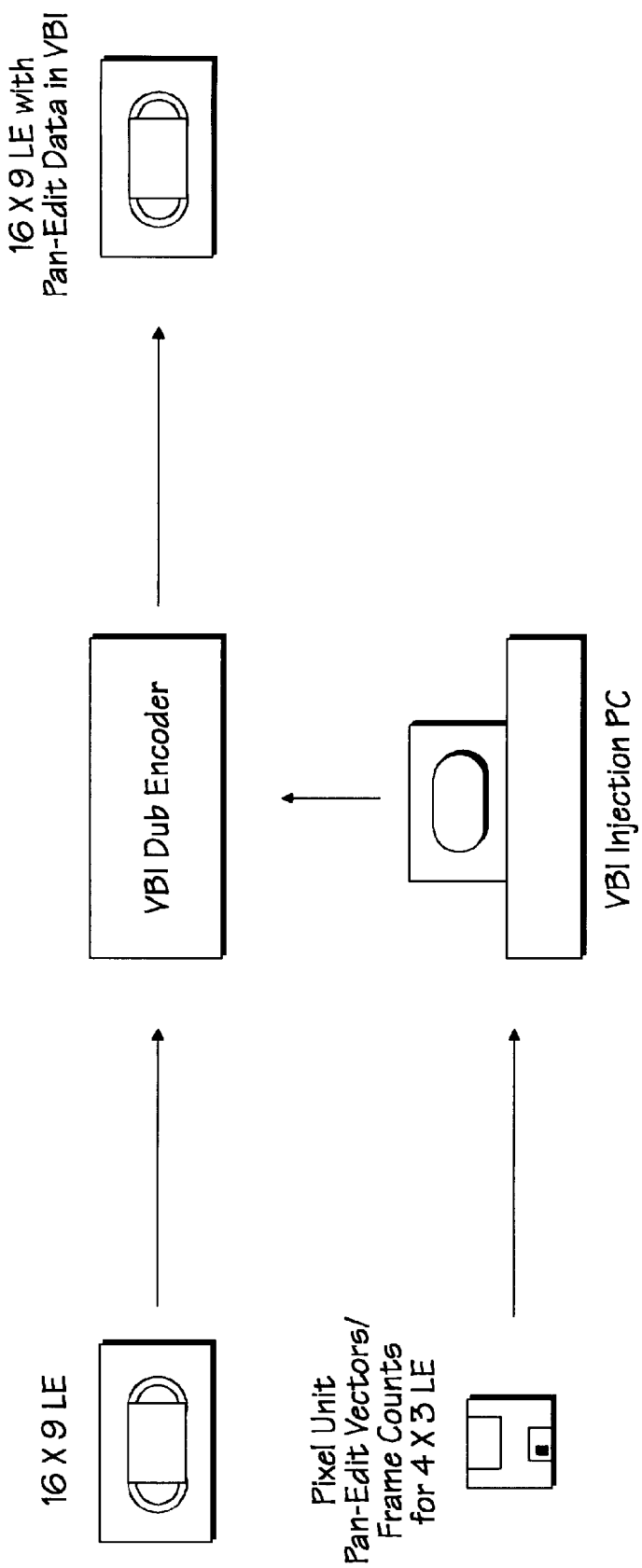
FIG. 4 illustrates the injection of pixel unit pan-edit vectors into the video blanking interval of a 16×9 film source.

As shown in FIG. 4, some current commercial equipment available for such encoding requires that the 16×9 edit source be presented in video tape format for use with a VBI dub encoder. The S-VHS format for video tapes is common in the industry however, other encoders may use other media, such as D1 format digital video tape, laser disks, etc. The pixel unit pan-edit information is provided to a computer system which is interfaced to the VBI dub encoder. Thus, as the letter boxed 16×9 version of the original film is dubbed from one video tape to a second video tape, the pan-edit information for a 4×3 letter box version of the film is injected into a VBI line or lines of the 16×9 film. Preferably, lines 14–20 of the video blanking interval are used for this purpose. The result of this injection process is a video tape (or other media) having a 16×9 letter box version of the film ready for broadcast or playback with pan-edit information corresponding to the 4×3 letter box edit included in a line or lines of the VBI. Of course, the same process may be used to generate a 16×9 pan-edit version of the original film with pan-edit information for a 4×3 pan-edit version encoded in the VBI.

Figure 5:
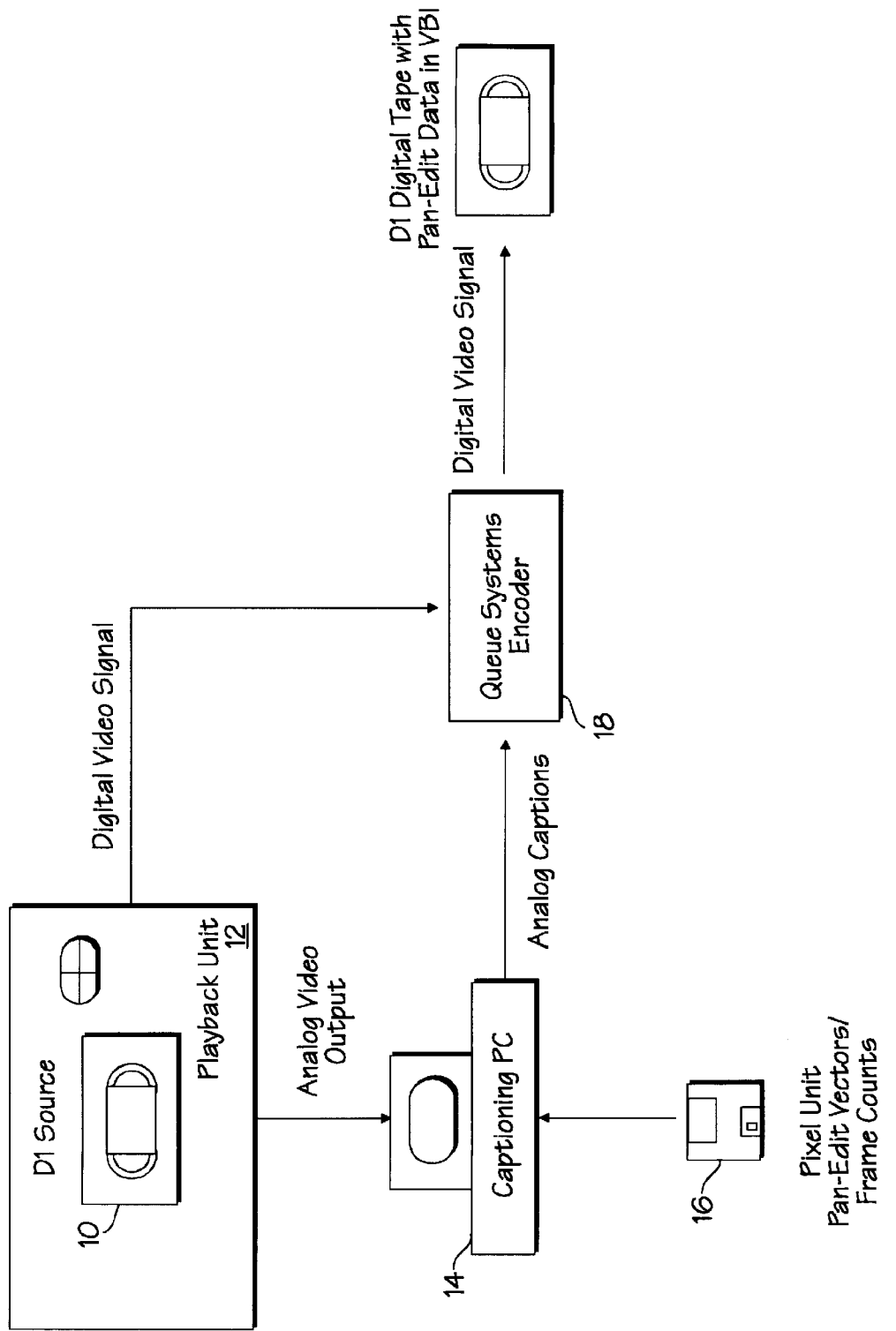
FIG. 5 illustrates the use of a Digital Caption and VITS Inserter for encoding information within the vertical blanking interval of a digital video signal.

A similar though somewhat different process may be used when digital equipment is available. Queue Systems of Los Angeles, Calif. currently manufactures a Digital Caption & VITS Inserter (DCVI) for D1 media. This equipment allows the use of conventional analog closed captioning equipment to caption D1 format digital video tapes. The DCVI may be adapted for use according to the present invention as illustrated in FIG. 5. A D1 digital video tape 10 contains a 16×9 version of an original film. As the D1 digital video tape 10 is played back for dubbing, two outputs, one analog and one digital, are provided from a playback unit 12. The analog output is provided to a conventional analog captioning computer 14 which also receives the pixel unit pan-edit information for a 4×3 version of the film. The pixel unit pan-edit information is stored on a disk 16 or other media suitable for use with the analog captioning computer 14. The captioning computer 14 provides an analog output signal to DCVI 18. The analog signal contains the captioning information to be encoded. That is, the analog signal represents the pan-edit information to be injected into the VBI of the D1 source. DCVI 18 is also provided with the digital output from the playback unit 12. DCVI 18 injects the pan-edit captioning information into the appropriate line or lines of the VBI of the digital source and provides a digital output signal suitable for recording on a D1 digital video tape.

Although illustrated for use with various conventional editing equipment, the present invention is not restricted by currently available equipment Indeed, in one embodiment, the present invention allows direct encoding of pixel unit pan edit information during the color correction process. Such an embodiment would provide a color corrector capable of generating pixel unit pan-edit vectors on a frame-by-frame basis. These vectors could then be directly encoded into the VBI of a video signal without need for the conversion process outlined above.

Figure 6A:
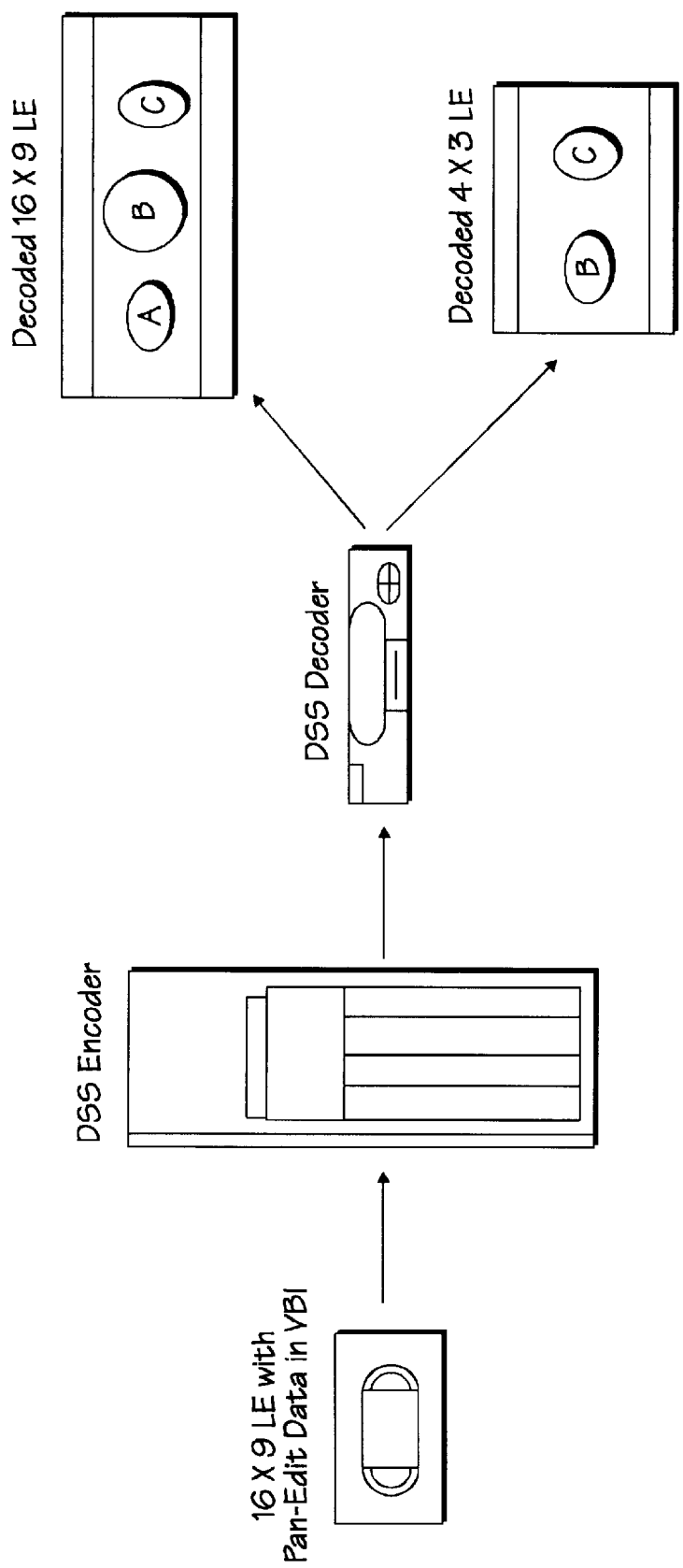
FIG. 6A illustrates the encoding and decoding of a 16×9 letter boxed video source with embedded pan-edit vectors for a 4×3 letter boxed version.
Figure 6B:
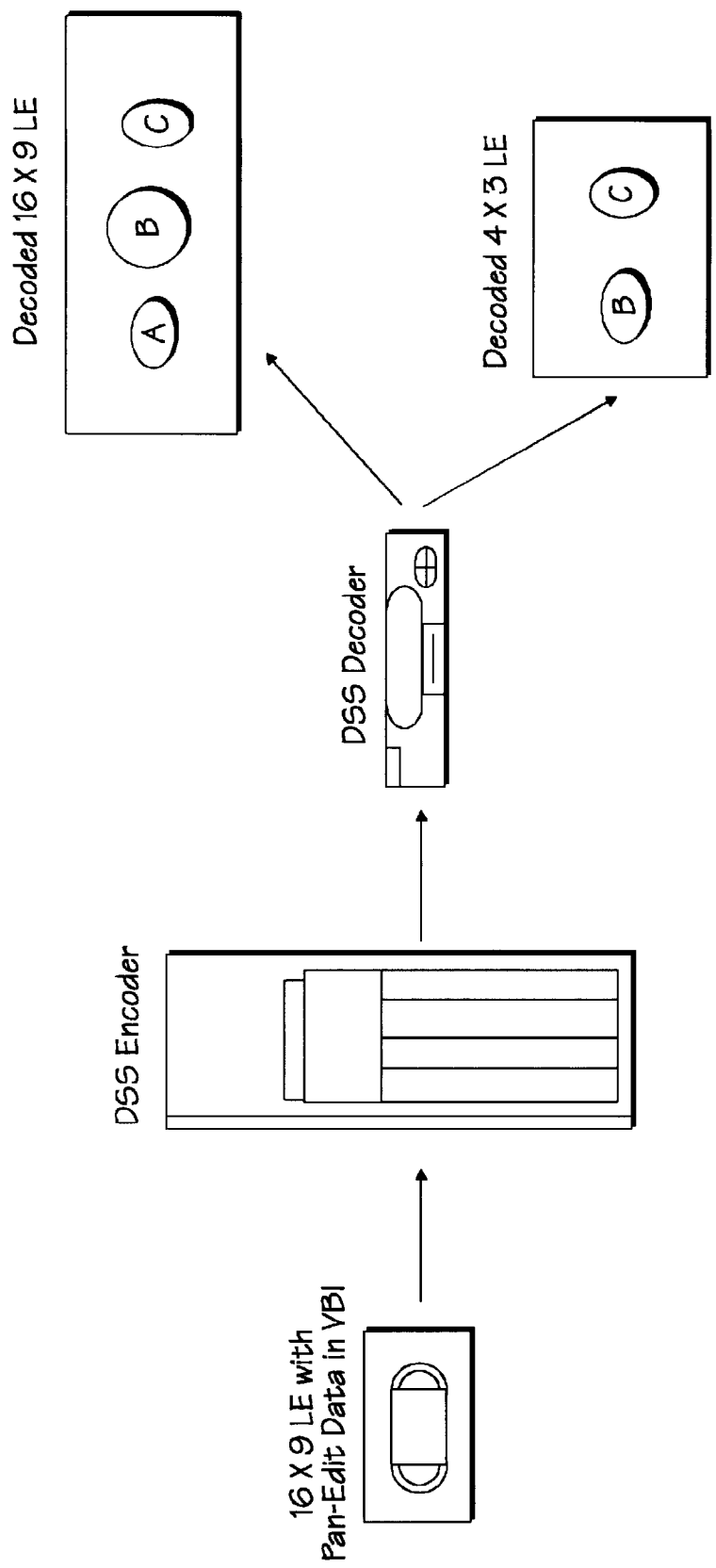
FIG. 6B illustrates the encoding and decoding of a 16×9 pan-edited video source with embedded pan-edit vectors for a 4×3 pan-edited version.

To allow for transmission of the film to viewers, suitable encoding of the 16×9 source with the 4×3 pan-edits for inclusion into the digital video signal transmitted by the satellite television or the cable television service provider is needed. In the case of satellite television, MPEG streams are commonly used. Accordingly, the pan-edit information may be encoded into a predefined field (e.g., the user field or the picture extension field) of the MPEG video stream while the 16×9 source material is encoded into a data field of the MPEG video stream. FIGS. 6A and 6B illustrate this process.

As shown in FIG. 6A, a 16×9 letter boxed version of a film having pixel unit pan-edit vectors for a 4×3 letter boxed version encoded in the VBI is played out through an encoder. In the case of satellite television services, the encoder will be a DSS encoder. The encoder reads the 16×9 video information and encodes this information into a data field of the MPEG stream for transmission. In addition, the encoder reads the vertical blanking interval lines which contain the 4×3 pan-edit vectors and encodes those vectors into a predetermined field of the MPEG bit stream. At the user end, a decoder extracts the pan-edit information from the appropriate field of the received MPEG stream and applies it to the 16×9 format of the film material to generate a 4×3 version of the film for presentation on a standard 4×3 television, or other video viewing apparatus. Alternatively, if the user has a wide aspect ratio television, the 16×9 format version of the film can be displayed directly. Thus, the use of one bit stream to transmit both a 4×3 version and a 16×9 version of a film is achieved. FIG. 6B illustrates a similar process for two pan edit versions of a film.

Accordingly, a method and apparatus for encoding pan-edit information within a digital video bit stream for broadcast by a television service provider has been described. In the foregoing description, numerous specific details have been set forth in order to provide a thorough understanding of the present invention. However, those skilled in the art will realize that some or all of these details are not required. Accordingly, the present invention is to be measured only in terms of claims which follow.

What is claimed is:

1. A method of transmitting a digital video signal, comprising the steps of:

transmitting a digital bit stream including video data for presentation on a television receiver having a first aspect ratio, said digital bit stream including a first field, and transmitting within said first field of said digital bit stream pan-edit vectors represented in a pixel unit format, which vectors when applied to said video data produce a resulting signal for presentation on a television receiver having a second aspect ratio, said pan-edit vectors having been converted to said pixel unit format prior to transmitting said digital bit stream.

2. The method of claim 1 wherein said digital video signal is an MPEG stream.

3. The method of claim 2 wherein said first aspect ratio is 16×9 and said second aspect ratio is 4×3.

4. The method of claim 3 wherein said digital bit stream is generated prior to said step of transmitting a digital bit stream by digitally encoding a video signal retrieved from a video storage media.

5. The method of claim 4 wherein said video storage media is a video tape.

6. The method of claim 4 wherein said video storage media is a computer readable media.

7. The method of claim 4 wherein said vertical signal includes a video blanking interval and wherein said pan-edit vectors are encoded within said vertical blanking interval.

8. The method of claim 7 wherein said pan-edit vectors are encoded within lines 14–20 of said vertical blanking interval.

9. The method of claim 8 wherein said first field is a user field or a picture extension field.

10. A digital video transmission system, comprising:

a source of video data including first data for presentation on a video viewing system having a first viewing aspect ratio and second data converted so as to be represented in a pixel unit format for use with said first data to generate a video signal for presentation on a video viewing system having a second viewing aspect ratio; and an encoder for receiving a video signal from said source, said video signal including said first data and said second data, said encoder configured to generate a digital video signal from said video signal.

11. A digital video transmission system as in claim 10 further comprising a transmission link coupled to said encoder, said transmission link for transmitting said digital video signal.

12. A digital video transmission system as in claim 11 wherein said transmission link comprises a satellite transmission system.

13. A digital video transmission system as in claim 11 wherein said transmission link comprises a cable television transmission system.

14. A digital video transmission system as in claim 10 wherein said encoder is further configured to include said second data within a predefined field of said digital video signal.

15. A digital video transmission system as in claim 14 wherein said digital video signal is an MPEG stream.

16. A digital video transmission system as in claim 15 wherein said second data comprises pan-edit vectors.

17. A digital video transmission system as in claim 16 wherein said source comprises a video tape.

18. A digital video transmission system as in claim 16 wherein said source comprises a computer readable media.

19. A digital video transmission system as in claim 11 further comprising a decoder configured to receive said digital video signal transmitted across said transmission link and to decode said digital video signal to extract said first data to generate a video signal for presentation to a television.

20. A digital video transmission system as in claim 19 wherein said decoder is further configured to apply said second data to said first data to generate a video signal for presentation to a television.

21. A method of encoding pan-edit vectors into a video signal, comprising the steps of:

editing a first formatted version of a video signal to produce a second formatted version of said video signal, said second formatted version having associated pan-edit vectors;

converting said pan-edit vectors to a pixel unit format;

recording said first formatted version of said video signal on a media in a signal format which includes a vertical blanking interval; and recording said pan-edit vectors on said media at a location within said vertical blanking interval in said pixel unit format.

22. The method of claim 21 wherein said signal format is a television signal format.

23. The method of claim 22 wherein said television signal format is NTSC.

24. The method of claim 22 wherein said television signal format is PAL.

25. The method of claim 22 wherein said media is a video tape.

26. The method of claim 22 wherein said media is a computer readable media.

27. The method of claim 22 wherein said steps of recording said first formatted version and recording said pan-edit vectors are performed at the same time.

28. The method of claim 22 further comprising the step of encoding a resulting video signal present on said media after said step of recording said pan-edit vectors in a digital bit stream.

29. The method of claim 28 wherein said digital bit stream includes a predefined field and said pan-edit vectors are encoded within said predefined field.

30. The method of claim 29 wherein said digital bit stream is an MPEG bit stream.

31. The method of claim 21 wherein said pan-edit vectors are extracted using a color corrector during said step of editing.

32. A method of encoding pan-edit vectors during film post production, comprising the steps of:

editing a master copy of a film to produce a first formatted version of said film and pan-edit vectors corresponding to a second formatted version of said film;

converting said pan-edit vectors to a pixel unit format;

recording said first formatted version of said film on a media in a signal format which includes a vertical blanking interval; and recording said pan-edit vectors on said media at a location within said vertical blanking interval.

33. The method of claim 32 wherein said signal format is a television signal format.

34. The method of claim 33 wherein said television signal format is NTSC.

35. The method of claim 33 wherein said television signal format is PAL.

36. The method of claim 33 wherein said media is a video tape.

37. The method of claim 33 wherein said media is a computer readable media.

38. The method of claim 33 wherein said steps of recording said first formatted version of said film and recording said pan-edit vectors are performed at the same time.

39. The method of claim 33 further comprising the step of encoding a resulting video signal present on said media after said step of recording said pan-edit vectors in a digital bit stream.

40. The method of claim 39 wherein said digital bit stream includes a predefined field and said pan-edit vectors are encoded within said predefined field.

41. The method of claim 40 wherein said digital bit stream is an MPEG bit stream.

42. The method of claim 32 wherein said pan-edit vectors are extracted using a color corrector during said step of editing.

* * * * *

UNITED STATES PATENT AND TRADEMARK OFFICE
CERTIFICATE OF CORRECTION

PATENT NO. : 5,926,613
DATED : July 20, 1999
INVENTOR(S) : Mark Lindsay Schaffer It is certified that error appears in the above-identified patent and that said Letters Patent is hereby corrected as shown below:

In column 5 at line 53 delete "equipment" and insert --equipment.--

Signed and Sealed this

Twenty-seventh Day of March, 2001

*Attest:*

NICHOLAS P. GODICI

*Attesting Officer*   *Acting Director of the United States Patent and Trademark Office*